Patented Sept. 22, 1953

2,653,174

UNITED STATES PATENT OFFICE 2,653,174

PURIFICATION OF CHLOROCYCLOHEXANES

Georg Scheuing and Curt Vogelbach, Ingelheim am Rhine, Germany, assignors to Ernst Boehringer, Albert Boehringer, Julius Liebrecht, Ilse Liebrecht, born Boehringer, trading under the firm of C. H. Boehringer Sohn, Ingelheim am Rhine, Germany No Drawing. Application September 22, 1949, Serial No. 117,258. In Germany July 4, 1949

8 Claims. (Cl. 260—648)

This invention is concerned with improvements in or relating to the purification of crude mixtures of chlorocyclohexanes or fractions of them resulting from the addition of chlorine to benzene.

By the addition of chlorine to benzene, there are formed, according to the respective working conditions, beside a mixture of isomeric hexachlorocyclohexanes also higher chlorinated cyclohexanes and chlorinated by-products from the impurities of benzene. Therefore the crude product obtained has a penetrating, adhering, disagreeable smell, and furthermore, due to their dissolving effect, these impurities render difficult the isolation of the pure hexachlorocyclohexanes and especially of the important -isomeric compound. As the physical properties of the impurities are similar to those of the hexa-chlorocyclohexanes their separation is difficult.

According to the invention these difficulties can be overcome by treating the crude mixtures of chlorocyclohexanes or fractions of them obtained by the addition of chlorine to benzene with alkaline agents in a small excess compared to the amount of higher chlorinated cyclohexanes contained in the mixture. A larger excess of alkaline agents may be supplied, but in this case it is necessary to interrupt the reaction after a certain time previously determined by tests. The mixture to be purified can be subjected to the treatment with alkaline agents in solution as well as in emulsion.

By the process according to the invention the higher chlorinated cyclohexanes are aromatized without noticeably decomposing the hexa-chlorocyclohexanes and especially the valuable $\gamma$-compound. After aromatizing the impurities their removal is easy, owing to the considerable changes of their physical properties. They can be separated in a usual manner from the hexa-chlorocyclohexanes, for instance by fractional distillation, water-vapor distillation or by treatment with suitable solvents. By the process according to the invention, the adhering, penetrating and disagreeable smell of the crude mixtures is largely removed and the isolation of the pure hexa-chlorocyclohexanes can be performed much easier.

As alkaline agents are preferably used alcoholic solutions of caustic potash or caustic soda. The impurities of the crude mixtures being chiefly hepta- and octa-chlorocyclohexanes, the aromatization yields the the various isomeric tetra-chlorobenzenes and penta-chlorobenzene which largely differ from the hexa-chlorocyclohexanes in their boiling points and other physical properties. If solutions of caustic potash and caustic soda are used, they must be added in such an amount to enable them to neutralize three molecular proportions of hydrochloric acid for one molecular proportion of hepta- and octa-chlorocyclohexanes present in the mixture. Other alkaline agents such as ammonia may also be used.

The purification achieved according to the invention is surprising to the man skilled in the art as it is well known that the hexa-chlorocyclohexanes themselves are easily aromatized by alkalies. I. B. La Clair (see Analytical Chemistry 20, 241 (1948)) for instance has aromatized the pure isomeric compounds of hexa-chlorocyclohexane in a diluted solution at 0° C., and has found half-time periods of 2 and 12 minutes respectively for the $\alpha$- and $\delta$-hexa-chlorocyclohexane.

The following examples, which are given only as an illustration, describe the manner in which the invention may be carried out without limiting it to the temperatures, ratios and chemicals used in the examples.

Example 1

400 g. of a paste containing about 50 per cent higher chlorinated cyclohexanes and about 50 per cent hexa-chlorocyclohexanes are dissolved in 2 liters methyl-alcohol and treated during one hour with 500 c. c. methyl-alcoholic 4 N caustic soda solution at room temperature. After decanting from the precipitated sodium chloride, the solvent is evaporated, and the solid is fractionated in the vacuum.

In the preliminary fraction are contained small amounts of isomeric tri-chlorobenzenes, in the following fraction about 130 g. tetra- and penta-chlorobenzene, and in the chief fraction about 190 g. hexa-chlorocyclohexanes.

Example 2

1000 g. of a crude mixture of chlorocyclohexanes containing also a larger quantity of hepta- and octa-chlorocyclohexanes are emulsified in a mixture of 1 liter benzene and 2 liters aqueous methyl-alcohol (10 per cent water content). Then are added 600 c. c. 5 N caustic soda solution at room temperature. After a short time standing the solvent is evaporated and the mixture is worked up as above. The first fraction contains 206 g. aromatic chlorine compounds and the second fraction, 621 g. of isomeric hexa-chlorocyclohexanes.

Example 3

1000 g. of a crude mixture containing chlorocyclohexanes and a larger quantity of isomeric hepta- and octa-chlorocyclohexanes are dissolved in 10 liters methyl-alcohol. After the solution is cooled down to 0° C., 6.3 liters of 1 N methyl-alcoholic caustic soda solution are added. The temperature rises to about 20° C. After a previously tested period of exactly 1 minutes and 50 seconds the reaction is interrupted by the addition of 500 c. c. 10 N hydrochloric acid. Then the solvent is evaporated and the reaction mixture is subjected to a fractional distillation in the vacuum. In the first fraction are contained 198 g. aromatic chlorine compounds and in the second fraction 632 g. hexa-chlorocyclohexanes.

What we claim is:

1. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in amount sufficient to react with and cause aromatization of said higher chlorinated cyclohexanes but insufficient to reset with said hexachlorocyclohexanes, and recovering purified hexa-chlorocyclohexanes.

2. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in amount sufficient to react with and cause aromatization of said higher chlorinated cyclohexanes but insufficient to react with said hexachlorocyclohexanes, and recovering purified hexa-chlorocyclohexanes, said alkaline agents being in excess relative to the amount of said higher chlorinated cyclohexanes.

3. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in amount sufficient to react with and cause aromatization of said higher chlorinated cyclohexanes but insufficient to react with said hexachlorocyclohexanes, and recovering purified hexa-chlorocyclohexanes, the amount of said alkaline agents being sufficient to neutralize three molecular proportions of hydrochloric acid for one molecular proportion of said higher chlorinated cyclohexanes.

4. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in solution in amount sufficient to react with and cause aromatization of said higher chlorinated cyclohexanes but insufficient to react with said hexachlorocyclohexanes, and recovering purified hexa-chlorocyclohexanes.

5. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in emulsion in amount sufficient to react with and cause aromatization of said higher chlorinated cyclohexanes but insufficient to react with said hexa-chlorocyclohexanes, and recovering purified hexa-chlorocyclohexanes.

6. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents taken from the class consisting of alcoholic solutions of caustic soda, caustic potash and ammonia, in amount sufficient to react with and cause aromatization of said higher chlorinated cyclohexanes but insufficient to react with said hexachlorocyclohexanes, and recovering purified hexa-chlorocyclohexanes.

7. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents taken from the class consisting of alcoholic solutions of caustic soda, caustic potash and ammonia, in amount sufficient to react with and cause aromatization of said higher chlorinated cyclohexanes but insufficient to react with said hexachlorocyclohexanes, and recovering purified hexa-chlorocyclohexanes, the amount of said alkaline agents being sufficient to neutralize three molecular proportions of hydrochloric acid for one molecular proportion of said higher chlorinated cyclohexanes.

8. A process of purifying hexa-chlorocyclohexanes resulting from the addition of chlorine to benzene and containing higher chlorinated cyclohexanes comprising determining the amount of said higher chlorinated cyclohexanes present, adding thereto alkaline agents in amount at least sufficient to react with and cause aromatization of said higher chlorinated cyclohexanes, thereafter interrupting the reaction before said alkaline agents react with said hexachlorocyclohexanes by adding acidifying agents to the reaction mixture, and recovering purified hexa-chlorocyclohexanes.

GEORG SCHEUING.
CURT VOGELBACH.

References Cited in the file of this patent

OTHER REFERENCES

Van der Linden, "Rec. Trav. Chim. Des. Pays" vol. 45, pages 231–247 (1912).

Ven der Linden, "Rec. Trav. Chim. Des. Pays Bas," vol. 57, pages 217–224 (1938).

La Clair, "Analytical Chem.," vol. 20, pages 241–245 (March 1948).